United States Patent
Aidlin et al.

[11] 3,791,553
[45] Feb. 12, 1974

[54] HOPPER-TYPE APPARATUS FOR ORIENTING AND FEEDING TUBULAR CONTAINERS OR LIKE ARTICLES

[75] Inventors: Samuel S. Aidlin, New York; Stephen H. Aidlin, Valley Stream; David Rich, Merrick, all of N.Y.

[73] Assignee: Aidlin Automation, Inc., Brooklyn, N.Y.

[22] Filed: Mar. 6, 1972

[21] Appl. No.: 232,049

[52] U.S. Cl............... 221/156, 221/169, 221/241, 198/33 R
[51] Int. Cl............................................. B65h 9/10
[58] Field of Search ... 221/156, 160, 167, 169, 170, 221/241, 210, 217, 218, 219; 198/33 R, 211

[56] References Cited
UNITED STATES PATENTS

| | | | |
|---|---|---|---|
| 3,572,494 | 3/1971 | Aidlin et al. | 221/156 X |
| 2,639,034 | 5/1953 | Roeber | 221/160 |
| 3,656,604 | 4/1972 | Sterling | 221/160 X |
| 1,415,937 | 5/1922 | Lippitz | 221/241 X |
| 233,095 | 10/1880 | Hill | 221/160 |

Primary Examiner—Samuel F. Coleman
Assistant Examiner—Joseph J. Rolla
Attorney, Agent, or Firm—George Gottlieb

[57] ABSTRACT

Hopper-type apparatus for orienting and feeding tubular containers of different lengths and thicknesses in which the containers are picked up from the pile at the bottom of the tilted hopper by a rotating feed ring having radially arranged article receiving pockets. Properly oriented containers are frictionally gripped by a friction bar as they ascend and released at the top of the hopper into an outlet chute. Misoriented containers are held away from the friction bar by pins extending radially into the pockets at their peripheral ends to drop back into the hopper. Properly oriented containers shorter than the pockets are moved into position for gripping by the bar by a jet of compressed fluid as the pockets pass it on their ascent. The raised separations between the pockets forming their side walls are formed with transverse slots opposite a midpoint of the pins, forming an interrupted circle. An arcuate friction bar is adjustably mounted for movement into and out of the slots for gripping containers of different thicknesses.

8 Claims, 4 Drawing Figures

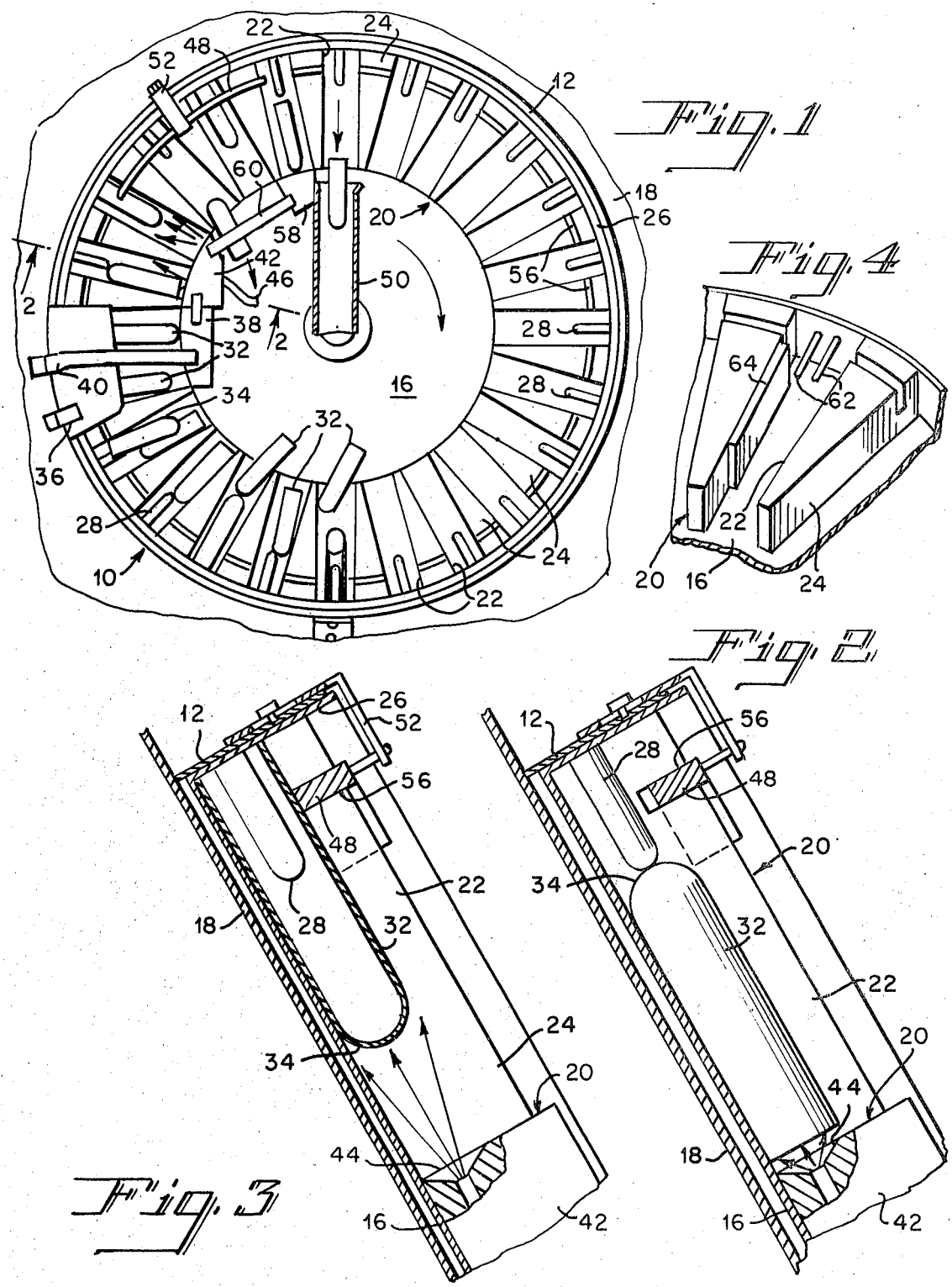

HOPPER-TYPE APPARATUS FOR ORIENTING AND FEEDING TUBULAR CONTAINERS OR LIKE ARTICLES

The present invention relates to hopper-type apparatus for automatically unscrambling and feeding articles in a predetermined oriented position. More particularly, the invention relates to such apparatus which is capable of unscrambling, orienting and feeding tubular articles having one closed end and which are of substantially even cross section, substantially throughout their length, and have no appreciable neck portion at their open end, such as jars or tubes, particularly jars and vials or tubes of light weight. The present invention is an extension and an improvement over the invention described and claimed in U.S. Pat. No. 3,572,494, dated Mar. 30, 1971.

In the said patent, there is described hopper-type apparatus for orienting and feeding jars, or the like, which includes a rotary, feed ring at the bottom of an inclined cylindrical hopper; the feed ring having radial recesses formed therein for picking up haphazardly disposed articles from a pile at the bottom of hopper for the discharge of those properly oriented within the recesses at the top of the hopper into a chute that conveys the discharged oriented articles out of the hopper.

In said apparatus, each recess in the feed ring is closed at its peripheral end and is provided with a pin that extends radially from the closure part way thereinto in spaced relation to the recess walls. Each pin permits a jar, or the like, entering the recess with its opening foremost to enter fully into the recess and prevents a jar entering the recess closed end foremost from fully entering the recess. A friction bar is disposed above the feed ring in position to frictionally engage the portion of the article fitted over the pin to hold it in place within the recess until it is carried over the chute inlet, where the article is freed to drop into the chute. Those articles disposed within the recess with their opening facing the center of the hopper, have their closed ends impinge against the ends of the pins and are not engaged by the friction bar and are dropped out from the recesses and returned to the hopper at a point before they reach the chute inlet.

While the apparatus of the said patent is highly efficient for unscrambling and feeding oriented tubular articles, the utility of such apparatus is limited, generally, to orienting and feeding articles of the same or within a very limited range of length and thickness. It is the object of the present invention, therefore, to provide apparatus of the character described in which a single apparatus is capable of unscrambling, orienting and feeding tubular articles of varying lengths and thicknesses, to thereby eliminate the need for providing an individual apparatus for the orienting and feeding of each different size and thickness of articles and this making possible a great economy in equipment and floor space in factories, especially filling and assembling plants.

The present invention is also directed to the provision of apparatus of the character described which may be readily adapted for feeding articles, of the character described, that vary in length without varying in thickness, as well as articles which vary in thickness without varying in length, and also for orienting and feeding articles that vary both in thickness and length.

The present invention is directed to the provision of apparatus of the character described which is particularly adapted for use in orienting and feeding tubular articles of light weight, such as the aluminum or plastic covers for cigars, or the like, of different lengths and thickness.

The foregoing and other objects and advantages of the apparatus of the present invention will become more readily apparent to those skilled in the art, from the embodiment thereof shown in the accompanying drawings, and from the description following. It is to be understood, however, that such embodiment is shown by way of illustration only, to make the principles and practice of the invention more readily comprehensible, and without any intent of limiting the invention to the specific details therein shown.

In the drawings:

FIG. 1 is a more or less schematic plan view of the rotary hopper bottom of the hopper of the apparatus of the present invention;

FIG. 2 is a section, on an enlarged scale, taken on line 2—2 of FIG. 1, showing a misoriented, relatively short, tube of relatively thin cross section disposed within a feeding recess of the feed ring of the rotary hopper bottom;

FIG. 3 is a section taken along the same line of FIG. 2, showing a similar properly oriented article within the same recess; and FIG. 4 is a fragmentary plan view of a modified form of feed ring of the apparatus of the invention.

Generally stated, the invention consists in providing the apparatus with a rotating feed ring whose recesses are of a length to accommodate the longest of the tubular articles contemplated to be fed by the apparatus and of a depth and width to accommodate the thickest of such articles. Each recess is closed at its peripheral end and is provided with one or more radially disposed pins extending from its closure and spaced from its sides. An arcuate friction finger is provided at the upper portion of the ascending quarter of the hopper. Shorter articles oriented with their openings facing peripherally are blown inwardly into the recesses over the impinging pins, for engagement by the friction bar, by jets of air directed against their closed ends, and they are then held by the friction bar to a point opposite an outlet chute where they are released and dropped into the outlet chute. To feed articles of a great variety of thickness, each section of the ring separating adjacent recesses is formed with a transverse arcuate slot or groove opposite a midpoint of the pins; the grooves forming an interrupted circle on the surface of the ring, and the friction bar is adjustably mounted to be moved into the grooves for engaging articles of lesser thickness and out of the grooves to engage articles of greater thickness.

In the accompanying drawings, the more or less schematically illustrated apparatus is shown to comprise a hopper, generally designated as 10, of generally conventional construction, including a cylindrical wall 12, mounted on a table, 14, which is supported, in any suitable manner, at an angle to the vertical (FIGS. 2 and 3). The hopper 10 is provided with a bottom, 16, which is mounted for rotation, as in a clockwise direction, as illustrated, on a tilted table, 18. The means or mechanism for rotatably supporting the hopper 10 and for rotating the bottom 16 are not specifically illustrated in the drawings as they may be of any conventional type used in the prior art and, therefore, do not constitute any part of the present invention.

Peripherally supported at the bottom of the hopper, as on the periphery of the bottom 16 thereof, is an unscrambling and feeding ring, generally designated as 20, which may be integral with the bottom 16 or secured thereon. Feeding ring 20 includes radially extending grooves or pockets, 22, which are separated and preferably regularly spaced from one another by radial spacing elements 24 whose sides form the sides of the grooves Spacing elements 24 may be integrally connected or each separately secured to bottom 16, in spaced relation, to form the grooves or pockets 22.

Each groove 22 is closed at its peripheral end by an end wall, 26, which may, preferably, comprise part of a continuous ring or hoop surrounding the peripheral edge of feeding ring 20. The end wall 26 of each groove 22 has extending therefrom, inwardly radially into the groove 20, and in spaced relation to its sides and bottom, one or more impinging pins, 28; such pins 28 extending only a relatively short distance into the groove.

It will be apparent that when bottom 16 is rotated within the cylinder 12 in which there is disposed a pile of haphazardly arranged articles such as the tubular articles 32 which are each closed at one end, as at 34, the grooves 20 of the feeding ring 16 will pick up such tubular articles in a haphazard manner; some with their open ends peripherally facing and others with their closed ends peripherally facing. The latter articles will be prevented, by pins 28 impinging against their closed end 34, from fully entering into the peripheral or inner portion of the grooves 20; whereas the articles picked up with their open ends peripherally facing will have their openings fit over the pins and thus move fully inwardly into the grooves.

It may here be stated that the apparatus of the invention is adapted for use on tubular articles of the character described, of varying lengths but not exceeding the distance between the end of an impinging pin and the inner edge of the feeding ring, or the inner end of a groove 22, and that it may be used to feed articles of a thickness only one of which may be accommodated in the width of a groove 22. However, it may here also be stated, that the width of a groove 22 may be varied, to reduce it, by the application of a shim against any one side thereof in any suitable manner, as will be readily understood by anyone skilled in the art. In the latter instance, where a shim is used, more than one impinging pin 28 may be set in each end wall 26, so that at least one of the pins will be located to be centered for entering into the opening of a relatively thinner tubular article.

To prevent the movement of more than one article 32 by any one groove 22 as it ascends towards the top of the hopper, wiping means may be provided to dislodge the excess tube, which would lie on top of a properly situated tube and, therefore, project above the ring 16, to return it into the hopper. While various means may be utilized for the purpose, one preferred means, comprises a wiping plate, 36, suitably supported above the ring 16 in close proximity to its surface, whose lower edge may be engaged by the superfluous tube which will then be displaced and thrown back into the hopper.

In order to prevent tubular containers 32, carried by grooves 22, from dropping out from such grooves, by gravity, as the grooves enter the upper ascending quarter of the hopper, a guard plate, 38, is provided in close proximity to the inner edge of the feeding ring 20 to block the open inner ends of grooves 22 and thus prevent the articles contained in the passing grooves from dropping out therefrom. The guard plates, 38, may be supported in fixed position in any suitable manner as by means of an inverted L-shaped bracket, 40, secured to plate 38 and to the upper edge of the hopper cylinder 12.

Guard plate 38 may extend only a short distance into the upper ascending quarter of the hopper as from the "9 o'clock" position to approximately the "10 o'clock" position, where it is replaced by an adjoining manifold air nozzle, 42, having a plurality of air outlets, 44, in its side facing the interior of passing grooves 22. Manifold nozzle 42 may likewise be mounted in fixed position in any desired manner and may be connected as by a tube, 46, to a source of compressed air or other gaseous fluid (not shown) and may preferably be of a length to encompass between its longitudinal ends approximately two passing grooves, 22.

It will be apparent that the grooves 22 of feed ring 20 will pick up containers 32 from the bottom of the hopper in haphazard fashion; some with their openings facing the periphery of the feed ring and others with their openings facing the interior of the hopper and their closed end abutting the inner end of an impinging pin 28. While the container holding grooves remain at the bottom of the hopper and in the lower ascending quarter thereof, the containers 32 contained within them will tend to be disposed, by gravity, at a maximum inner position within the groove. As grooves 22 move into the upper ascending quarter of the hopper, their contents will be prevented from dropping out therefrom, by gravity, by guard plate 38 and by the nozzle 42; all of them having their ends facing the center of the hopper rest against the guard plate and the nozzle. As grooves 22 pass the nozzle, 42, the properly oriented tubular containers, 32, namely those with their openings facing the periphery of the feed ring 20, will be blown inwardly to have their openings fit around impinging pins 28, and abut the closure wall 26; whereas, those improperly oriented will be immobilized against inward movement by pins 28 abutting their closed ends 34.

Mounted over feed ring 20, in close proximity packaging its surface and in parallel relation thereto, at a point overlying a mid-point of pins 28, is a friction bar, 48. Friction bar 48 is disposed over the upper portion of the ascending quarter of the hopper and extends from a point approximately radially opposite the upper end of nozzle 42 to a point short of the upper end, or the 12 o'clock position of the hopper. By this arrangement of the friction bar 48, the latter may frictionally engage the portions of the properly oriented containers. 32, that fit over the pins, 28, and project above the feed ring 20, and maintain such containers on the feed ring, 20, until they reach a point in their ascent when they approach the top, or 12 o'clock position, of the hopper, where they are released from the friction bar 48 to drop into an outlet chute, 50, in properly oriented position. It will be obvious that misoriented containers, 32, will drop out of their grooves as soon as they pass the upper end of nozzle 42.

Friction bar 48 may 20, preferably adjustable and resiliently supported in place as by a resilient inverted L-shaped bracket, 52, secured to an upright bar, 54, uprightly adjustably mounted on the wall of the cylinder 12, whereby the friction bar may be adjusted at any desired position above the surface of feed ring 20 for engagement of containers 32 of varying thicknesses, and projecting varying extents above such surface. In order to adapt the apparatus of the invention for orienting and feeding tubular containers 32 of a thickness less than the depth of grooves 22, arcuate slots are formed in each of the spacing elements, 24, opposite a midpoint of pins 28, each slot formed on the radius from the center of the hopper, 10, with all of the slots forming an interrupted circle. Slots 56 and friction bar 48 are arranged to register so that the latter may be adjusted to be lowered into the slots, 56, to engage the containers, 32, held in grooves 22, which are of lesser thickness than the depth of such grooves.

In order to make possible an increase in the speed of rotation of the feeding ring, 20, and thereby increase the feeding speed of the apparatus, particularly when it is used for orienting and feeding containers of lesser length, means may be provided for eliminating the time-lag required for the movement of such containers from the innermost part of the recesses, 22, where they had been blown by the air jet from nozzle 42, and held in place by friction bar 48, the friction bar, 48, may be terminated short of the uppermost point of the hopper and short of the opening of chute 50, so that such containers will commence to drop to the outer ends of the recesses, 22, before they reach the outlet into the chute, 50. A second guard plate, 58, may be provided against the inner edge of the feed ring, 20, extending from a point opposite the terminus of the shortened friction bar, 48, to the chute, 50, so that the relatively short containers released by the friction bar drop against the guard plate 58, and commence moving directly into the chute when they reach it. Guard plate 58 may be independently supported, in the same manner as guard plate 38, or may be supported from guard plate 38, as by the bridge, 60, connecting them, as illustrated.

It may here be stated that misoriented containers, 32, instead of dropping back into the bottom of the hopper to be haphazardly disposed therein and be hahazardly picked up by the feeding ring, 20, from the hopper bottom, such misoriented containers may be discharged into an inverter, of any desirable kind, such as described and claimed in U.S. Pat. No. 3,517,796, which will discharge each such container directly into a groove, 22, of the feeding ring 20 in properly oriented position; namely, with the opening of the container facing the periphery of the feeding ring.

FIG. 4 illustrates a modification of the apparatus especially adapted for feeding containers that are thin relative to the width of the recesses 22, without the risk of disposal of more than one such thin container within a recess, and without the risk of such thin containers being moved inwardly into a recess, 22, by the air jet, to one or the other side of an impinging pin, 28. Such modification provides for the provision of more than one impinging pin, such as two spaced impinging pins, 62, in each recess 22, and the provision of removable shims, 64, removably secured in any desired manner within each of the recesses 22, against one of its side walls. By this arrangement, the recesses 22 are narrowed to prevent the reception of more than one container therein and such container is automatically directed towards the pin, 62, remote from the shim, which will either impinge against the bottom, 34, of the container or fit within the opening thereof and be encompassed thereby.

This completes the description of the apparatus of the present invention. It will be readily apparent that such apparatus will be highly efficient for the sure and rapid orienting and feeding of tubular containers that are neckless or substantially neckless. It will be also apparent that such apparatus is suitable, within substantial limit, for feeding such containers of different lengths or thicknesses, or both, and that it may be used for that purpose with only minor adjustments for the different thicknesses of containers. It will be additionally apparent that such apparatus is of relatively simple construction and simple and easy to operate.

It will be further apparent that numerous modifications and variations may be made in the apparatus of the invention, by anyone skilled in the art, in accordance with the principles of the invention hereinabove set forth and without the exercise of any inventive ingenuity.

What we claim is:

1. Automatic orienting and feeding apparatus for tubular containers of the character described, comprising a cylindrical hopper disposed at an incline to the vertical, a rotatable, article-moving feeding ring disposed peripherally within said hopper, at the bottom thereof, said ring having a plurality of spaced, radially extending, article-receiving recesses formed thereacross, said recesses separated by thickened ring portions forming the sides thereof, each said recess having a pin extending longitudinally inwardly thereinto from its peripheral end, in spaced relation to the sides and bottom thereof and adapted to have the closed end of a container positioned within said recess with said closed end facing the peripheral end thereof to impinge thereagainst to prevent movement of said container into said end; an outlet chute supported on said hopper with its inlet end disposed in close proximity to the inner edge of said ring and in position to receive containers dropping out of said recesses as they are rotated to the uppermost position within said hopper; a guard plate supported within said hopper in proximity to the inner edge of said ring, on its ascending side, and extending from a point adjacent the horizontal axis of said hopper a relatively short distance into the upper ascending quarter thereof; fluid jet nozzle means connectible to a source of fluid under pressure disposed within said hopper, adjacent to the inner edge of said ring and adjacent to and upwardly of said guard plate, for discharging fluid under pressure into recesses passing thereby to move containers within said recesses inwardly into said recesses whereby containers disposed within recesses with their open ends in peripherally facing position are positioned in the peripheral ends of said recesses, said nozzle means terminating short of the inlet end of said chute; and means supported on said hopper over said ring at a point substantially radially opposite the upper end of said nozzle means for frictionally engaging the containers disposed in a selected one of the two positions within said recesses for frictionally holding containers in said selected position within their recesses to a point adjacent the uppermost position of said hopper, whereby said last mentioned containers are released into said inlet opening of said chute.

2. The apparatus of claim 1 wherein said frictional engaging means comprises a friction bar curved on a radius from the center of said hopper and means adjustably supporting said bar for movement toward and away from said ring and wherein said thickened ring portions are each provided with a curved, transverse slot in register with said bar, said slots in said thickened ring portions defining an interrupted circle, said bar moveable into said slots for frictionally engaging containers of a thickness less than the depth of said recesses disposed therewithin.

3. The apparatus of claim 1 wherein said frictional engaging means comprises a friction bar curved on a radius from the center of said hopper, and means supporting said friction bar on said hopper parallel to the surface of said ring opposite a mid-point of said pins.

4. The apparatus of claim 3 wherein a second guard plate is supported on said hopper adjacent the inner edge of said ring in spaced relation above said nozzle and adjacent the inlet end of said chute, said friction bar terminating on a radial line passing through the lower end of said second guard plate.

5. The apparatus of claim 3 wherein said friction bar supporting means is adjustable for movement of said bar toward and away from said ring and each said thickened ring portion is provided with an arcuate slot extending transversely thereacross in register with said friction bar and adapted to have said friction bar move thereinto to thereby frictionally engage a container within a recess of lesser thickness than the depth of said recess.

6. The apparatus of claim 1, wherein each said groove is formed to accommodate a single container and wherein means are provided for removing from said feed ring excess containers engaged for movement thereby; said means comprising a member supported on said hopper in closely spaced, parallel relation to said feed ring, at the upper part of the lower portion of the ascending side of said hopper.

7. The apparatus of claim 1, wherein each said recess is provided with a pair of said container-bottom engaging pins, in spaced relation to one another, and wherein a shim is disposed against a side of each said recess whereby said recesses are adapted for receiving a single container of lesser cross-section than the width of said recess.

8. Automatic orienting and feeding apparatus for tubular containers, comprising a cylindrical hopper disposed at an incline to the vertical, a rotatable, article-moving feeding ring disposed peripherally within said hopper at the bottom thereof, said ring having a plurality of spaced, radially extending, article-receiving recesses formed thereacross, said recesses separated by thickened ring portions forming the sides thereof, a friction bar curved at a radius extending from the center of said hopper, means adjustably supporting said friction bar along the ascending side of said hopper above and in parallel relation to said feeding ring, said thickened ring portions each having a curved slot formed thereacross arranged to be in register with said friction bar as it passes thereunder, said friction bar moveable into and out of said slots whereby said friction bar may be adjusted to frictionally engage tubular containers within said grooves, each of a thickness less than the depth of said grooves.

* * * * *